United States Patent [19]

Conry

[11] Patent Number: 5,070,704
[45] Date of Patent: Dec. 10, 1991

[54] HEATING AND COOLING SYSTEMS

[75] Inventor: Ronald D. Conry, Melbourne, Australia

[73] Assignee: Multistack Pty. Ltd., Bayswater, Australia

[21] Appl. No.: 536,612

[22] PCT Filed: Jan. 13, 1989

[86] PCT No.: PCT/AU89/00012
§ 371 Date: Jul. 17, 1990
§ 102(e) Date: Jul. 17, 1990

[87] PCT Pub. No.: WO89/06774
PCT Pub. Date: Jul. 27, 1989

[30] Foreign Application Priority Data
Jan. 19, 1988 [AU] Australia ............................ PI6365

[51] Int. Cl.$^5$ ............................................. F25D 17/02
[52] U.S. Cl. ........................................ 62/175; 62/201; 62/435
[58] Field of Search ................... 62/201, 180, 435, 175

[56] References Cited

U.S. PATENT DOCUMENTS

4,483,152 11/1984 Bitondo ................................. 62/201
4,926,649 5/1990 Martinez, Jr. ......................... 62/201

Primary Examiner—William E. Wayner
Attorney, Agent, or Firm—Dvorak and Traub

[57] ABSTRACT

A heating and/or cooling system incorporates a number of modular refrigeration units each of which includes at least one compressor, an evaporator and a condenser. A variable speed circulating water pump circulates water through each evaporator/condenser, which are connected in parallel across the respective supply line and return line. A master controller activates and deactivates individual compressors in accordance with load demand. Shut-off valves close off the water flow through the respective evaporator and/or condenser of any units deactivated and the resulting changes in the pressure differential in the supply and return lines is sensed by sensor which sends a signal to the pump motor speed controller which changes the output of the pump to restore a predetermined pressure differential.

26 Claims, 5 Drawing Sheets

HEATING AND COOLING SYSTEMS

FIELD OF THE INVENTION

This invention relates to improvements in heating and cooling systems and relates particularly to improvements in air conditioning and chilling systems.

Recent developments in air conditioning systems involve the utilization of modular refrigeration units each having an evaporator and condenser in heat exchange relation with the fluid to be cooled and/or heated. With the modular system, each refrigeration unit is provided with headers for supply and return of the heat exchange fluid. A plurality of refrigeration units are connected in parallel, and the heat exchange fluid circulates through each evaporator and condenser heat exchanger.

The control of such a modular system enables individual refrigeration units to be operated in accordance with the load on the system. Thus, in times of high load, all refrigeration units will be operating to provide maximum heating and/or cooling capacity. When the load is reduced, refrigeration units may be down loaded, or made inoperative, thus reducing the operating costs of the system and resting units which are not required.

BACKGROUND OF THE INVENTION

The modular refrigeration system overcomes a number of disadvantages of previous systems, particularly with regard to system breakdowns and system expansion. The modular system also provide substantial economies in being able to operate only those refrigeration units necessary for the load at any particular time. Power is therefore saved in not having to run refrigeration units which are unnecessary, or in running units at lower than optimum peak operating efficiency.

With a modular heating and/or cooling system, however, the heating and/or cooling heat exchange fluid, which is usually water, passes through the heat exchange fluid manifolds supplying the heat exchange fluid to each of the refrigeration units. The pumping capacity required, therefore, for both heat exchange fluids, i.e., the heat exchange fluid through the evaporators and the condensers of each refrigeration unit, is necessarily that for supplying fluid through all refrigeration units and, preferably, is of greater capacity allowing for expansion of the system both in terms of the number of refrigeration units and/or the load requirements.

BACKGROUND ART

U.S. Pat. No. 2,935,857 to McFarlan discloses an air conditioning system having two separate refrigeration systems each having evaporator-chillers and condensers. The condensers are connected in parallel in the heating water circuit while the evaporators are connected in parallel in the cooling water circuit. Valves are inserted in the water inlets to the evaporators and further valves are inserted in the water inlets to the condensers.

The system is operated through a controller which stops and starts the refrigeration systems. The water valves are also opened and closed by the controller.

Hot water from the condensers and cold water from the evaporators flows to heating/cooling units in each of the various zones of the space to be conditioned. The water is returned through a common return line which flows to the condensers, with any excess passing to a dispersion well. Water is supplied to the water circuits of the evaporators from a separate well.

This system enables one of the two refrigeration systems to operate under light load conditions, the water flow to the evaporator and chiller of the other refrigeration system being shut-off. This produces some economies in operation of the refrigeration system but produces variations in water pressures and, hence, water flow and temperture gradients throughout the system.

It is desirable to provide a heating and cooling system in which water pressure differentials and water flow through the heating and/or cooling system is maintained substantially constant.

It is also desirable to provide an improved heating and/or cooling system for a modular refrigeration system having a multiplicity of refrigeration units in which the flow of heat exchange fluid through the condenser and/or chiller of each unit is dependent on the operating state of that unit.

It is also desirable to optimize the power consumed by a modular refrigeration system when operated at less than maximum capacity by reducing the flow of heat exchange fluid through the system.

It is further desirable to reduce the flow of heat exchange fluid through heat exchangers of modular units which are not operating and, at the same time, maintain substantially constant pressure differentials throughout the heating and/or cooling system.

SUMMARY OF THE INVENTION

According to the present invention there is provided a heating and/or cooling system comprising a plurality of modular refrigeration units each of which has at least one compressor means, an evaporative heat exchanger and a condenser heat exchanger, supply and return manifold means on each unit for conveying a first heat exchange fluid, the manifold means being connected to manifold means of adjacent units, supply and return fluid conduit means extending between respective supply and return manifold means of each unit and the associated evaporative heat exchanger so that the evaporative heat exchangers are connected in parallel across the interconnected manifolds, pump means for the first heat exchange fluid, said pump means including means to vary the flow of the first heat exchange fluid, and valve means to selectively close at least one of the supply and return fluid conduit means.

Preferably, the pump means is a variable speed or variable capacity pump circulating the first heat exchange fluid through the system. In one particular arrangement, control means which controls the operation of the individual duration units determines changes in load conditions, such as through changes in return water temperature, conditioned zone temperatures, ambient temperatures, and the like, and controls the operation of the individual units in accordance with the load requirements. As the load decreases, individual refrigeration units are shut down. When a unit compressor means is deactivated, the valve means associated with that unit closes the fluid conduit means so that the evaporative heat exchanger is no longer connected in parallel with the remaining heat exchangers. This causes a change in the differential pressure between the supply and return manifolds. The pressure change is sensed and the pump means is varied to return the pressure differential to a predetermined level.

By using a variable speed or variable capacity pump means, the power requirements for the pump means is able to be reduced during reduced system load. Thus, as the load decreases and modular units are made inactive, the valve means on those inactive units are selectively closed to thereby close the heat exchangers thereof to the heat exchange fluid. The power supplied to the pump means is then also reduced due to the reduced pumping load resulting from a reduced number of heat exchangers in the circuit.

In one form of the invention, the valve means comprises a valve provided on the return conduit means of each unit. In another form of the invention, the valve means comprises butterfly valves on both or either the supply and return conduit means.

In a particular, preferred form of the invention, first and second supply and return manifold means are provided for both the evaporator heat exchanger and the condenser heat exchanger of the modular units. The manifold means comprise header pipes mounted on each unit with releasable pipe connectors at each end, such as those produced by Victaulic, which enable the header pipes of adjacent units to be connected together. The supply and return conduit means are connected into the respective supply and return header pipes so as to provide a fluid path from the supply header pipe through the supply conduit, the heat exchanger and return conduit to the return header pipe.

The valve means is preferably located in the return header pipe and is actuated to close the return conduit where it connects with the return header pipe. In one form of the invention the valve means has a valve head to close the entrance of the return conduit into the return header pipe, a valve stem extending diametrically and through a seal on the opposite side of the header pipe into a pressure chamber located thereon, a piston on the end of the valve stem, and a bleed line extending from the supply header to the pressure chamber whereby fluid under pressure from the supply header pipe may be applied to the top of the piston to move the valve into the closed position. A pneumatic, hydraulic or electrical actuator valve in the bleed line controls the flow of fluid from the supply header to the pressure chamber.

With this arrangement, by operation of the relatively small electric, pneumatic or hydraulic valve on the pressure bleed line, fluid under pressure from the supply header pipe is able to be used to actuate the valve to close the return conduit. The valve may be opened by closing the electric, pneumatic or hydraulic valve means which enables the pressure of fluid in the return conduit to move the valve head from the seat.

In order that the invention is more readily understood, embodiments thereof will now be described with reference to the accompanying drawings.

DESCRIPTION OF THE PREFERRED EMBODIMENTS

Figure 1:
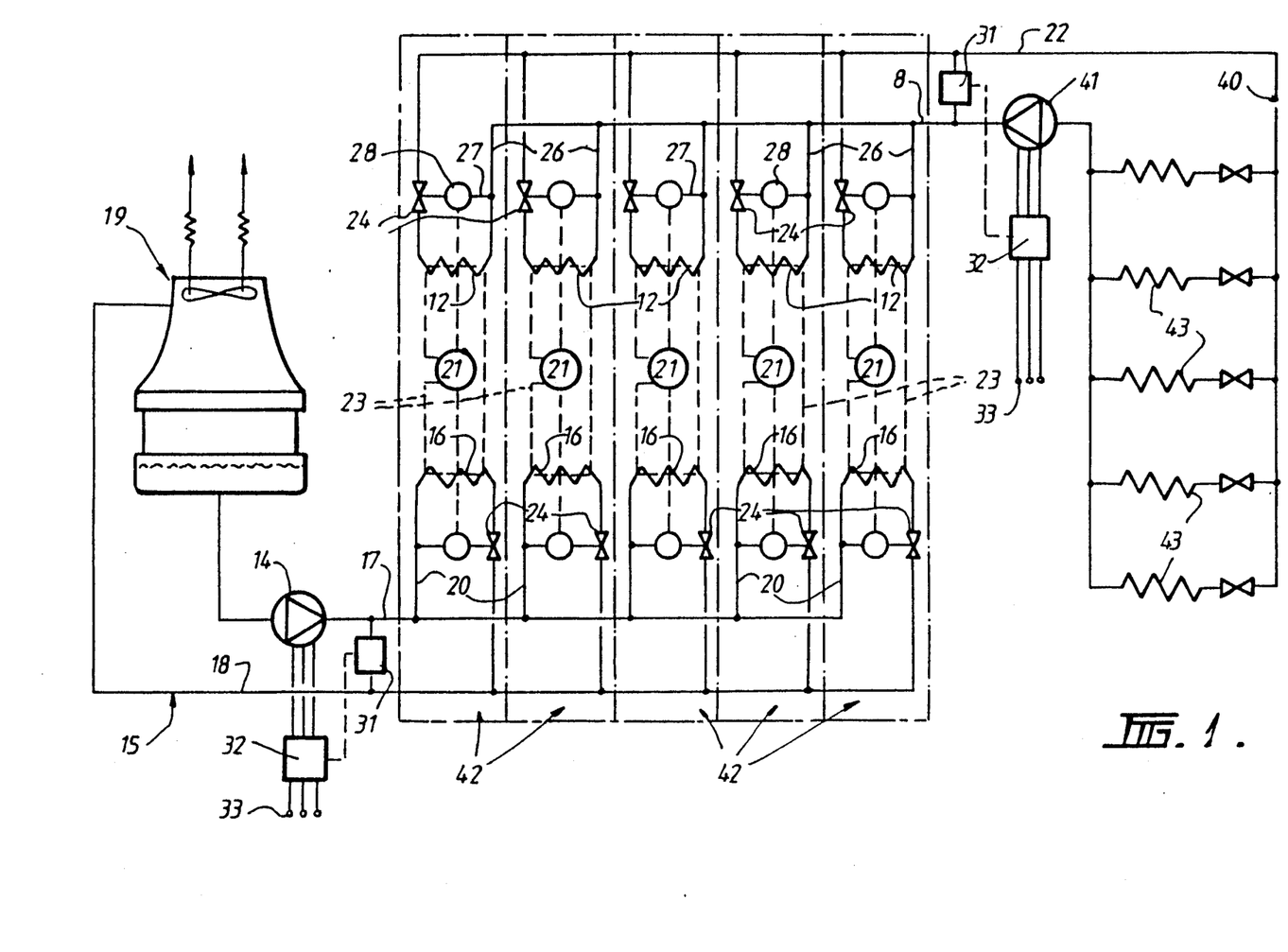
FIG. 1 is a fluid circuit diagram showing operation of the system of the invention.

Referring to FIG. 1 there is illustrated a cooling system in which a plurality of refrigeration units 42 are used to chill water which is circulated through a chilled water circuit 40 by a circulating pump 41. The chilled water passes through loads 43, which may comprise cold water coils in an air conditioning system. The pump 41 is a variable speed pump and is located in the water supply line 8. Connected in parallel between the water supply line 8 and a return line 22 are evaporator heat exchangers 12 associated with each of the refrigeration units 42.

A condenser water circuit has a condenser water pump 14 which supplies water to condenser heat exchangers 16 which are connected in parallel across supply and return lines 17 and 18, respectively. The condenser water is circulated through a water tower 19 where it is cooled, in the usual manner, by airflow and evaporation.

Each refrigeration unit 42 includes at least one compressor 21 which circulates refrigerant through a refrigeration circuit 23 which incorporates an evaporator and a condenser.

A shut-off valve 24 is connected in each of the water return lines from each evaporator heat exchanger 12 and each condenser heat exchanger 16. The valves 24 may be of any suitable form, but in the embodiment illustrated, the valves are servo valves which are actuated by water under pressure bled from the respective evaporator water supply line 26 or condenser water supply line 20. The bleed water passes through a bleed pipe 27 and is controlled by a solenoid valve 28 actuated in conjunction with the respective compressor 21.

A pressure differential sensor 31 is associated with both the chilled water circuit 40 and the condenser water circuit 15 to sense the pressure differential between the respective water supply lines 8 and 17 and the return lines 22 and 18. The pressure differential sensors 31 provide a signal to respective motor speed controllers 32 which operate to vary the speed of the respective pumps 41 and 14 so as to maintain a predetermined pressure differential.

Figure 2:
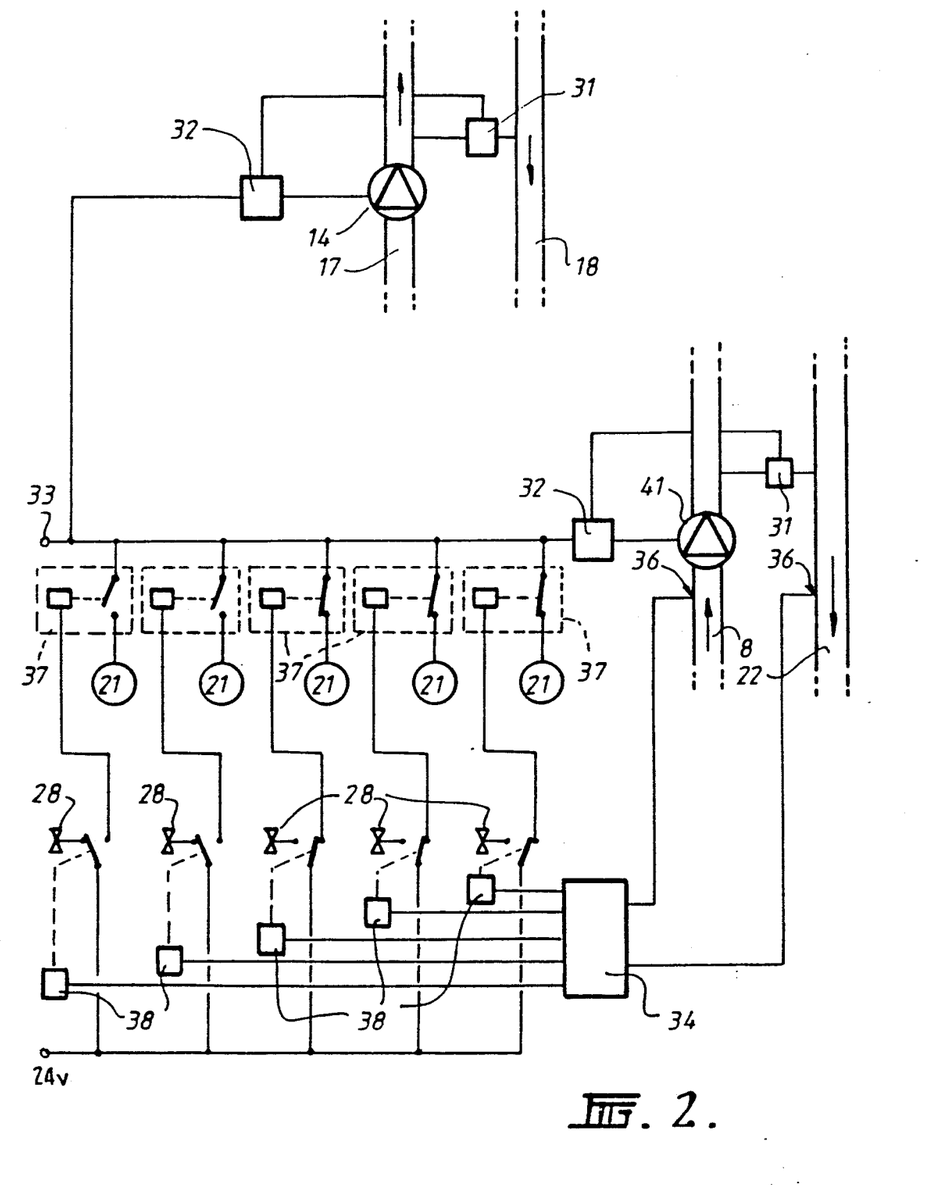
FIG. 2 is a simple schematic showing electrical controls for the system of FIG. 1.

Referring to FIG. 2, a 3-phase power supply 33 is provided for the chilled water circulating pump 41 and the condenser water pump 14. Each motor speed controller 32 is an inverter which, in response to signals from the respective pressure differential sensors 31, varies the frequency of supply to the respective pumps to thereby vary the pump speed and, thus, the water flow in the respective circuits which, accordingly, varies the pressure differential between the respective supply and return lines 8 and 17, and 22 and 18, respectively.

The system also includes a control circuit incorporating a master controller 34 which controls operation of the refrigeration units 42 in accordance with a variety of factors including load demand, unit operating time, fault diagnosis, maintenance schedules and the like. In order to detect load changes, the temperature of the chilled water is measured in the supply line 8 and return line 22 by appropriate temperature measuring devices 36. Each compressor 21 is controlled by a compressor contactor 37 which receives a 24 volt power supply through an outstation controller 38. The outstation controller 38 receives control signals from the master controller 34 in response to sensed load conditions and predetermined system parameters. The solenoid valves 28 for each servo valve 24 on the respective units 42 are also controlled by the outstation controllers 38 such that if the compressor contactor 37 is actuated, the associated solenoid valves 28 are de-energized and, conversely, if a compressor contactor 37 is de-energized the associated solenoid valves 28 are energized.

On full load, each of the refrigeration units 42 is operating and chiller water flows through each of the evaporator heat exchangers 12. When the load decreases, the temperature of the chilled water in the chilled water supply and return lines 8 and 22 changes which initiates, through the master controller, operation of one of the outstation controllers 38 to deactivate a compressor 21. At the same time, the associated solenoid valves 28 are energized to thereby activate the shut-off valve 24 in the respective return lines 22 and 18 preventing water flow through the respective evaporator heat exchanger 12 and condenser heat exchanger 16. The pressure differential sensors 31 then detect a change in the pressure differential between the respective supply and return lines due to one or more of the heat exchangers being taken out of the water circuits. The pressure differential sensors 31 signal the respective motor speed controllers 32 to thereby vary the speed of the respective pumps 41 and 14 to decrease the pumping speed, the flow of water in the respective circuits and, thus, reduce the differential pressure to the predetermined value.

It will be seen that the combination of valves and variable speed pumps enables a substantial reduction in power consumed when the system is operating at less than full load. Further, by utilizing servo operated valves, the power requirements for such valve operations are minimal.

Figure 3:
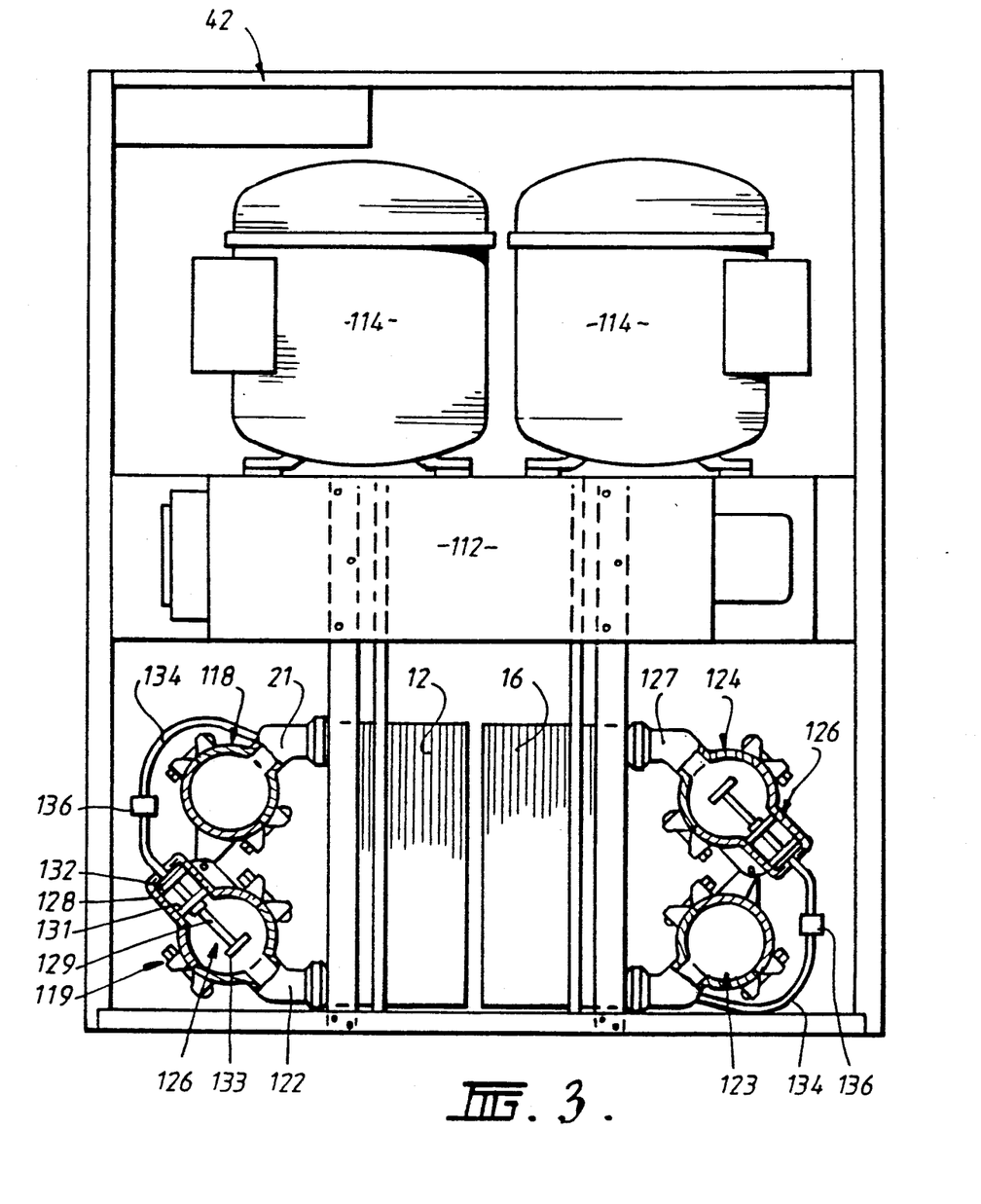
FIG. 3 is a schematic view indicating one modular refrigeration unit having supply and return header pipes for both the evaporator and condenser.
Figure 4:
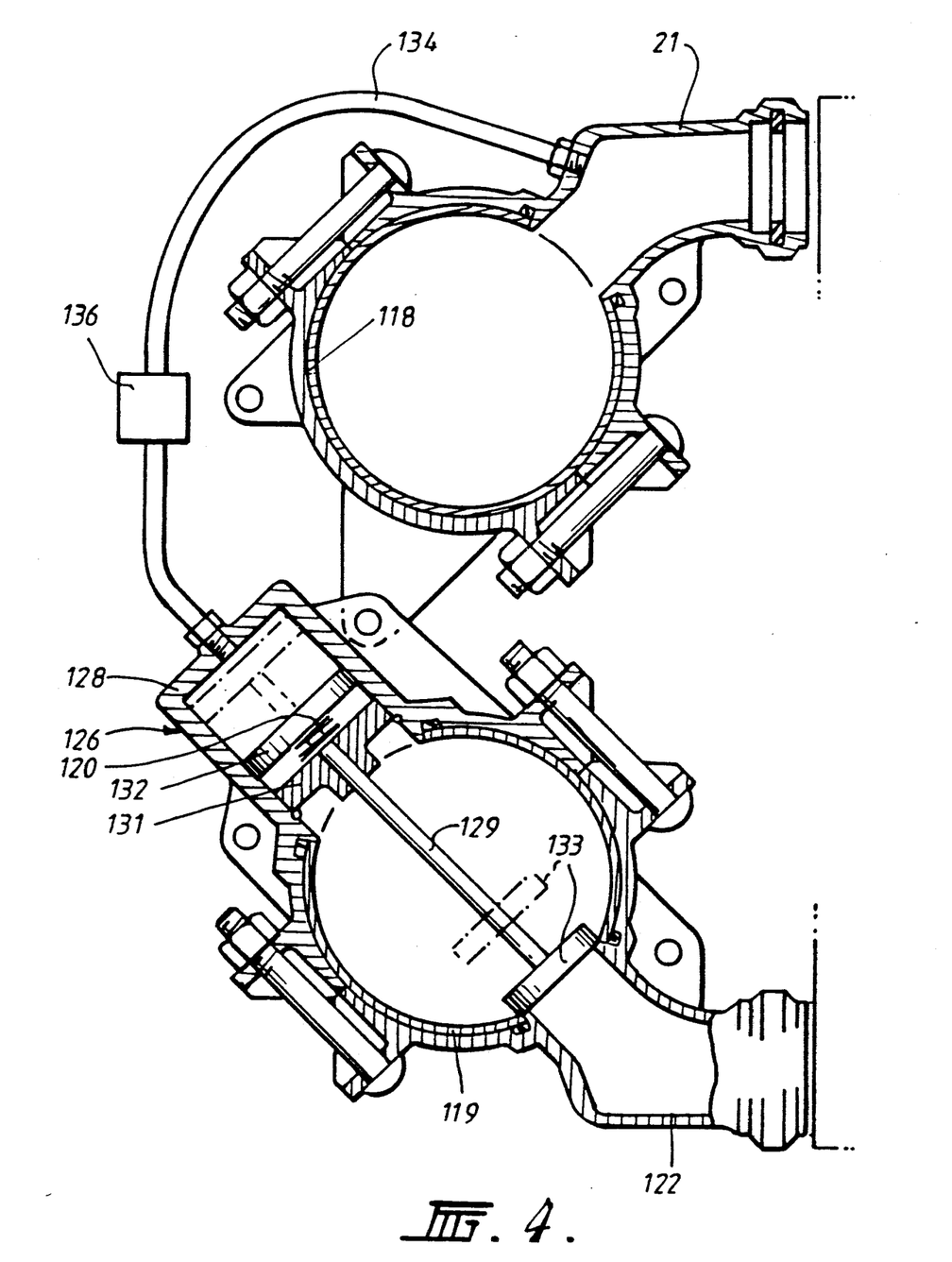
FIG. 4 is a detailed view of the supply and return header pipes and the servo valve of FIG. 2.
Figure 5:
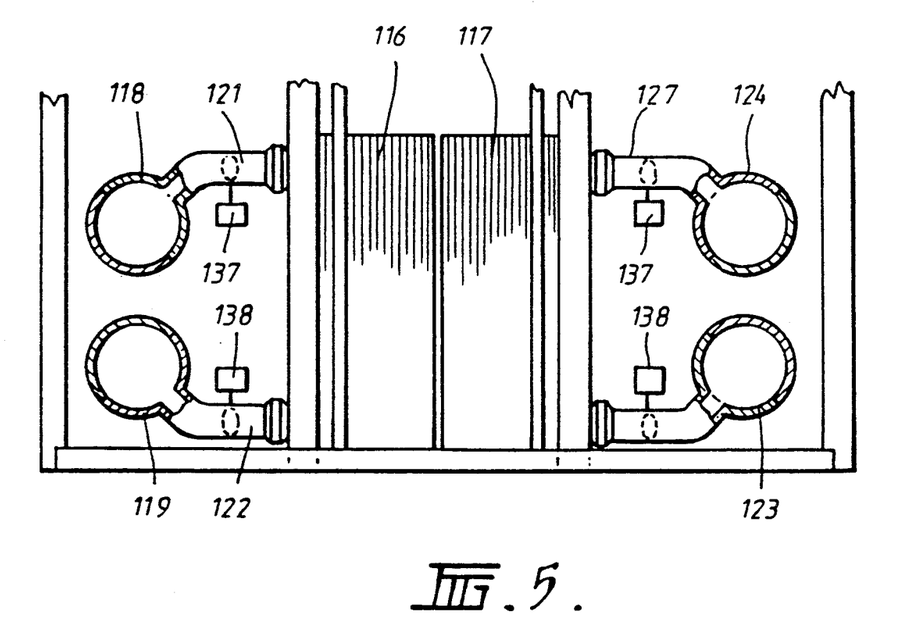
FIG. 5 is a view similar to FIG. 3 but illustrating a different form of valve.

Referring to FIGS. 3 to 5, there is illustrated a modular refrigeration unit 42 which comprises a housing 112 mounting a pair of compressor units 114 which have parallel refrigeration paths 23 including evaporators and condensers. The evaporators are located in a common evaporator heat exchanger 12 while the condensers are located in a common condenser heat exchanger 16. The evaporator heat exchanger is used to chill water which flows from the supply header pipe 118 through the heat exchanger 12 and to the return header pipe 119. A supply conduit 121 connects the supply header pipe 118 to the evaporator heat exchanger 12 while a return conduit 122 connects with the return header pipe 119.

Similarly, water is supplied to the condenser heat exchanger 16 from the supply and return header pipes 123 and 124, respectively.

In an air conditioning system, a plurality of modular refrigeration units 42 are connected in parallel so that the chiller water and the condenser water circulates through each of the evaporator heat exchanger 12 and condenser heat exchanger 16 of each unit in the system. As previously indicated, the master controller 34 controls the number of refrigeration units 42 operating at any one time commensurate with the load on the system. The number of units operating to maintain the chiller water at the desired temperature is reduced when the load decreases and individual units are deactivated in accordance with such decreasing load requirements.

Similarly, as the load increases, the master controller 34 activates units as necessary to maintain the desired chiller water (or heating water) temperature.

When a modular unit 42 is deactivated, one or more valves are actuated to close off the supply and/or return of chiller and/or heating water to the evaporative heat exchanger 12 and condenser heat exchanger 16. In the embodiment illustrated in FIGS. 3 and 4, a valve 126 is provided in the return header pipe 119 to operate on the return conduit 122. A similar valve is provided in the condenser water return header pipe 124 to operate on the condenser return conduit 127.

The valve 126 consists of a pressure chamber 128 located on the outside of the header pipe 119, a valve stem 129 passing through a seal 131 in the return header pipe 119, a piston 132 on the end of the valve stem 129 in the pressure chamber, a valve head 133 on the other end of the valve stem 129, the valve head being of a size to close the opening to the return conduit 122. A pressure bleed pipe 134 runs from the supply header pipe 118 to the pressure chamber 128 to bleed supply fluid to the pressure chamber 128 and thus cause the piston 132 to move the valve head 133 into the sealing position, as shown in solid lines in FIG. 4. The pressure bleed pipe 134 is fitted with a normally closed, solenoid actuated valve 136 which closes the bleed pipe 134.

A similar valve arrangement is located on the condenser side of the modular unit 42.

In normal operation, when the modular refrigeration unit is in operation, and the compressors 114 are in operation, the solenoid is deactivated thus closing the pressure bleed pipe 134. The pressure of chiller water in the return conduit 122 and the return spring 120 is sufficient to force the valve head 133 away from the seat so that the return conduit 122 opens into the return header pipe 119 as shown in chain dot lines in FIG. 4. Similarly, the return header pipe on the condenser heat exchanger 117 is open and heat exchange fluid flows through both the evaporative and condenser heat exchangers 12 and 16.

When the modular refrigeration unit is deactivated, the solenoid valves 136 are actuated to open the bleed pipe 134 and fluid under pressure from the supply header pipes 118 and 123, respectively, operate the respective valves 126 so as to close off the respective return conduits 122 and 127. Thus, water no longer flows through the evaporative heat exchanger 12 and condenser heat exchanger 16. By taking these heat exchangers out of the respective water circuits, the loads on the circulating pumps are reduced accordingly thus enabling a reduction in pumping power by reducing pump speed.

As the solenoid actuated valves 136 operate only on fluid bleed lines 134, sealing difficulties are avoided and the valves 136 may be of relatively simple construction.

Referring to the embodiment illustrated in FIG. 5, instead of using valves of the type illustrated in FIGS. 3 and 4, this embodiment shows the use of two solenoid actuated butterfly valves 137 and 138 in each of the supply conduit 121 and return conduit 122. With this arrangement, the butterfly valves 137 and 138 are actuated to directly close off both the supply conduit 121 and return conduit 122 simultaneously. Such butterfly valves 137 and 138 are located directly in the respective conduits and may, if desired, be actuated by a single actuating solenoid. Alternatively, such valves may be pneumatically or hydraulically operated.

It will be appreciated that although the specific embodiments described use variable speed pumps for circulating the chiller water and condenser water, variable capacity pumps, or a combination of variable speed and capacity pumps may be used. Alternatively, staged pumps or even a plurality of pumps can be used for water circulation with one or more stages or individual pumps of a group being deactivated to reduce water flow as required by system changes.

Further, it will be appreciated that the condenser heat exchanger for each unit may utilize air cooling in which case the invention will be applicable to the chiller water side of the units. Conversely, the units may be used for heating purposes in which case the invention will be applicable particularly to the condenser water circuit.

I claim:

1. A heating and/or cooling system comprising a plurality of modular refrigeration units each of which has at least one compressor means, an evaporator heat exchanger and a condenser heat exchanger, supply and return fluid conduit means on each unit for conveying a heat exchange fluid through the evaporator heat exchanger, said supply and return fluid conduit means being connected to respective supply and return manifold means so that the evaporator heat exchangers of the system are connected in parallel across the manifold means, pump means disposed in said manifold means for circulating the heat exchange fluid through the manifold means, said pump means including pump control means to vary the flow of said heat exchange fluid, and valve means associated with each unit to selectively close at least one of the supply and return fluid conduit means.

2. A system according to claim 1 and including differential pressure sensing means to sense the pressure differential between the supply and return manifold means, said pump control means being responsive to said sensing means to vary the flow of said heat exchange fluid to maintain a predetermined pressure differential.

3. A system according to claim 1 and including a master controller to monitor system operating parameters and control the modular units, the pump means and each valve means, said master controller receiving signals from temperature sensors in the supply and return manifold means, compressor contactors for each compressor means which are activated or deactivated by the master controller in response to manifold temperatures, and means to operate the valve means of those units which are deactivated to close the respective supply and/or return fluid conduit means.

4. A system according to claim 3 wherein said master controller activates or deactivates selected compressor means in response to manifold temperatures and so that all units operate substantially equally.

5. A system according to claim 4 wherein said valve means are mounted on each unit so as to selectively close only the return fluid conduit means.

6. A system according to claim 3 wherein said valve means are mounted on each unit so as to selectively close only the return fluid conduit means.

7. A system according to claim 1 wherein said valve means are mounted on each unit so as to selectively close only the return fluid conduit means.

8. A system according to claim 1 further including second supply and return conduit means conveying condenser fluid to the condenser heat exchanger of each unit, said second conduit means being connected to condenser fluid manifolds which are interconnected so that the condenser heat exchangers are connected in parallel, second pump means for circulating said condenser fluid, said second pump means having second pump control means to vary the flow of said condenser fluid, and condenser valve means to selectively close at least one of the second supply and return conduit means on each unit.

9. A system according to claim 1 wherein each said valve means comprises a servo valve having a valve head movable to substantially seal against a valve seat in the respective return fluid conduit means, a piston connected to the valve head, a pressure line to convey fluid from the supply manifold means to said piston, and closure means to selectively close the pressure line.

10. A system according to claim 9 wherein said closure means comprises an inline solenoid valve in the pressure line.

11. A system according to claim 10 wherein said solenoid valve is a normally closed valve which opens the pressure line when energised.

12. A system according to claim 10 wherein an outstation controller switches a supply voltage to either the solenoid valve or compressor contactor in response to the presence or absence of a control signal for actuation of the respective compressor means.

13. A system according to claim 1 wherein said pump control means comprises motor speed controller means to vary the speed of said pump means.

14. A system according to claim 1 wherein said condenser heat exchanger is an air-cooled heat exchanger.

15. An air conditioning system comprising a plurality of modular refrigeration units each having at least one compressor in a refrigeration circuit which includes an evaporator and a condenser, a chiller water circuit including water supply and return manifold pipes and a water circulating pump, a motor speed controller to control the speed of the pump motor, a pressure differential sensor to sense the water pressure difference between the supply and return manifold pipes, differential signal means to supply a control signal to the motor speed controller in response to a predetermined sensed pressure differential, a chiller water supply and return conduit for each evaporator to convey water from the chiller water circuit to a heat exchanger associated with the evaporator such that the heat exchangers are connected in parallel, a valve in at least one of each supply and return conduit, and valve actuating means to close the valves when the respective at least one compressor is deactivated.

16. A system according to claim 15 wherein said valve is a servo valve actuated by supply manifold water through a bleed pipe and controlled by a solenoid valve in the bleed pipe.

17. A system according to claim 15 wherein a temperature measuring device measures the temperature of the water in the supply and return manifold pipes, and a master controller activates or deactivates compressors of the system in response to measured temperatures and pre-programmed instructions to effect a decrease or increase, respectively, of the temperatures and, at the same time deactivates or activates, respectively, the valve actuating means.

18. A heating and/or cooling system comprising a plurality of modular refrigeration units each of which has at least one compressor means, an evaporator heat exchanger and a condenser heat exchanger, supply and return fluid conduit means being connected to respective supply and return manifold means so that the evaporator heat exchangers of the system are connected in parallel across the manifold means, pump means for circulating the heat exchange fluid through the manifold means, said pump means including pump control means to vary the flow of said heat exchange fluid, valve means associated with each unit to selectively close at least one of the supply and return fluid conduit means, second supply and return conduit means conveying condenser fluid to the condenser heat exchanger of each unit, said second conduit means being connected to condenser fluid manifolds which are interconnected so that the condenser heat exchangers are connected in parallel, second pump means for circulating said condenser fluid, said second pump means having second pump control means to vary the flow of said condenser fluid, and condenser valve means to selectively close at least one of the second supply and return conduit means on each unit.

19. A system according to claim 18 wherein said second pump control means includes a condenser fluid pressure differential sensor to sense the pressure differential between the condenser fluid supply manifold and return manifold, and is responsive to the sensor to vary the flow of condenser fluid to maintain a predetermined pressure differential.

20. A system according to claim 18 wherein said condenser fluid is circulated through a cooling tower.

21. A heating and/or cooling system comprising a plurality of modular refrigeration units each of which has at least one compressor means, an evaporator heat exchanger and a condenser heat exchanger supply and return fluid conduit means on each unit for conveying a heat exchange fluid through the evaporator heat exchanger, said supply and return fluid conduit means being connected to respective supply and return manifold means so that the evaporator heat exchangers of the system are connected in parallel across the manifold means, pump means for circulating the heat exchange fluid through the manifold means, said pump means including pump control means to vary the flow of said heat exchange fluid, valve means associated with each unit to selectively close at least one of the supply and return fluid conduit means, and differential pressure sensing means to sense the pressure differential between the supply and return manifold means, said pump control means being responsive to said sensing means to vary the flow of said heat exchange fluid to maintain a predetermined pressure differential.

22. A system according to claim 21 and including a master controller to monitor system operating parameters and control the modular units, the pump means and each valve means, said master controller receiving signals from temperature sensors in the supply and return manifold means, compressor contactors for each compressor means which are activated or deactivated by the master controller in response to manifold temperatures, and means to operate the valve means of those units which are deactivated to close the respective supply and/or return fluid conduit means.

23. A system according to claim 21 wherein said valve means are mounted on each unit so as to selectively close only the return fluid conduit means.

24. A heating and/or cooling system comprising a plurality of modular refrigeration units each of which has at least one compressor means, an evaporator heat exchanger and a condenser heat exchanger, supply and return fluid conduit means on each unit for conveying a heat exchange fluid through the evaporator heat exchanger, said supply and return fluid conduit means being connected to respective supply and return manifold means so that the evaporator heat exchangers of the system are connected in parallel across the manifold means, pump means for circulating the heat exchange fluid through the manifold means, said pump means including pump control means to vary the flow of said heat exchange fluid, valve means associated with each unit to selectively close said return fluid conduit means, a master controller to monitor system operating parameters and control the modular units, the pump means and each valve means, said master controller receiving signals from temperature sensors in the supply and return manifold means, compressor contactors for each compressor means which are activated or deactivated by the master controller in response to manifold temperatures, and means to operate the valve means of those units which are deactivated to close the respective supply and/or return fluid conduit means.

25. A heating and/or cooling system comprising a plurality of modular refrigeration units each of which has at least one compressor means, an evaporator heat exchanger and a condenser heat exchanger, supply and return fluid conduit means on each unit for conveying a heat exchange fluid through the evaporator heat exchanger, said supply and return fluid conduit means being connected to respective supply and return manifold means, so that the evaporator heat exchangers of the system are connected in parallel across the manifold means, pump means for circulating the heat exchange fluid through the manifold means, said pump means including pump control means to vary the flow of said heat exchange fluid, valve means associated with each unit to selectively close said supply fluid conduit means, a master controller to monitor system operating parameters and control the modular units, the pump means and each valve means, said master controller receiving signals from the temperature sensors in the supply and return manifold means, compressor contactors for each compressor means which are activated or deactivated by the master controller in response to manifold temperatures, means to operate the valve means of those units which are deactivated to close the respective supply and/or return fluid conduit means, wherein said master controller is arranged and constructed to activate or deactivate selected compressor means in response to manifold temperatures so that all units operate substantially equally.

26. A heating and/or cooling system comprising a plurality of modular refrigeration units each of which has at least one compressor means, an evaporator heat exchanger and a condenser heat exchanger, supply and return fluid conduit means on each unit for conveying a heat exchange fluid through the evaporator heat exchanger, said supply and return fluid conduit means being connected to respective supply and return manifold means so that the evaporator heat exchangers of the system are connected in parallel across the manifold means, pump means for circulating the heat exchange fluid through the manifold means, said pump means including pump control means to vary the flow of said heat exchange fluid, valve means associated with each unit to selectively close at least one of the supply and return fluid conduit means, said valve means comprising a servo valve having a valve head movable to substantially seal against a valve seat in the respective return fluid conduit means, a piston connected to the valve head, a pressure line to convey fluid from the supply manifold means to said piston, and closure means arranged and constructed to selectively close the pressure line, said closure means comprising an inline solenoid valve in the pressure line, wherein an outstation controller switches a supply voltage to either the solenoid valve or compressor contactor in response to the pressure or absence of a control signal for actuation of the respective compressor means.

* * * * *